United States Patent
Lin et al.

(10) Patent No.: US 10,708,032 B2
(45) Date of Patent: Jul. 7, 2020

(54) SYMBOL TIMING DETERMINING DEVICE AND METHOD

(71) Applicant: REALTEK SEMICONDUCTOR CORPORATION, Hsinchu (TW)

(72) Inventors: Chuan-Hu Lin, Changhua County (TW); Chung-Yao Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 74 days.

(21) Appl. No.: 16/226,926

(22) Filed: Dec. 20, 2018

(65) Prior Publication Data

US 2019/0215143 A1 Jul. 11, 2019

(30) Foreign Application Priority Data

Jan. 11, 2018 (TW) .............................. 107101022 A

(51) Int. Cl.
| | |
|---|---|
| *H04L 7/00* | (2006.01) |
| *H04L 25/02* | (2006.01) |
| *H04L 5/00* | (2006.01) |
| *H04W 24/08* | (2009.01) |
| *H04L 27/26* | (2006.01) |
| *H04W 84/12* | (2009.01) |

(52) U.S. Cl.
CPC .......... *H04L 7/0016* (2013.01); *H04L 5/0007* (2013.01); *H04L 25/0202* (2013.01);
(Continued)

(58) Field of Classification Search
CPC ............... H04L 7/0016; H04L 25/0212; H04L 27/2655; H04L 25/022; H04L 25/0202;
(Continued)

(56) References Cited

U.S. PATENT DOCUMENTS 10,225,034 B2 * 3/2019 Wigren ................ H04B 17/345
10,567,134 B1 * 2/2020 Schelstraete .......... H04L 5/0023
(Continued)

OTHER PUBLICATIONS

Yu-Zhen Chen, "Interoperable Symbol Timing Synchronization Algorithm between IEEE 802.11n and IEEE 802.11ag", Jul. 2012, National Taipei University of Technology.
(Continued)

*Primary Examiner* — Brian T O Connor
(74) *Attorney, Agent, or Firm* — WPAT, PC

(57) ABSTRACT

Disclosed is a symbol timing determining device including: a symbol timing detecting circuit detecting a reception signal to obtain a first symbol timing, and shifting the first symbol timing to obtain a second symbol timing; an estimation signal generating circuit processing the reception signal according to the first and the second symbol timings respectively, so as to obtain a first and a second channel estimation frequency-domain signals; a channel estimation impulse response signal generating circuit generating a first and a second channel estimation impulse response time-domain signals according to the first and the second channel estimation frequency-domain signals respectively; a power measuring circuit measuring the energy of the first and the second channel estimation impulse response time-domain signals according to a predetermined signal region respectively; and a decision circuit selecting one of the first and the second symbol timings according to a relation of the measured energy.

20 Claims, 9 Drawing Sheets

(52) U.S. Cl.
CPC ........ *H04L 25/022* (2013.01); *H04L 25/0212* (2013.01); *H04L 27/2655* (2013.01); *H04W 24/08* (2013.01); *H04L 5/0023* (2013.01); *H04W 84/12* (2013.01)

(58) Field of Classification Search
CPC . H04L 5/0007; H04L 5/0023; H04L 27/2675; H04L 27/2695; H04L 27/2662; H04W 24/08; H04W 84/12
See application file for complete search history.

(56) References Cited

U.S. PATENT DOCUMENTS

| | | |
|---|---|---|
| 2007/0217524 A1 | 9/2007 | Wang et al. |
| 2012/0281556 A1* | 11/2012 | Sayana ................. H04L 5/0035 370/252 |
| 2013/0136198 A1 | 5/2013 | Chavali et al. |
| 2018/0365975 A1* | 12/2018 | Xu .......................... G01S 7/415 |
| 2019/0028304 A1* | 1/2019 | Rode ................ H04L 25/03343 |

OTHER PUBLICATIONS

Fang Yuan, "Symbol timing synchronization for IEEE 802.11n WLAN systems", Jul. 2013, vol. 21 No. 13, Electronic Design Engineering.
"Taiwan IPO, office action for the TW patent application 107101022 (no English translation is available) dated Oct. 22, 2018 (6 pages)".
M. Cho, et al., "Symbol Timing Synchronization for IEEE 802.11n WLAN Systems," IEEE 2009 First Asian Himalayas International Conference on Internet, Nov. 3-5, 2009.

* cited by examiner

SYMBOL TIMING DETERMINING DEVICE AND METHOD

BACKGROUND OF THE INVENTION

1. Field of the Invention

The present invention relates to a symbol timing determining device and method, especially to a symbol timing determining device and method for a communication system.

2. Description of Related Art

In an Orthogonal Frequency-Division Multiplexing (OFDM) communication system using multiple antennas for communication, beamforming is a signal processing technique for directional signal transmission or reception; more specifically, this technique is achieved by combining elements in the multiple antennas in a way such that signals at particular phase angles experience constructive interference while others experience destructive interference. In order to prevent an unexpected antenna beamforming effect and nonuniform transmission in the air, a transmitter of the OFDM communication system makes use of Cyclic Shift Diversity (CSD) technique to increase spatial diversity. For instance, as shown in FIG. 1, a wireless OFDM communication system includes a transmitter 110 and a receiver 120. The transmitter 110 includes a plurality of antennas, each of which transmits the same signal. However, these antennas transmit the same signal at different times according to different assigned CSD time shifts respectively; consequently, the transmission signals from these antennas are unlikely to satisfy a condition of specific interference and thus an unexpected antenna beamforming effect is prevented. In light of the above, the receiver 120 will receive multipath versions of the same signal. These multipath versions not only include versions caused by different transmission paths in a real space but also include pseudo multipath versions (as shown in FIG. 3). If the receiver 120 mistakes a pseudo path as a real path and thereby adopts a wrong symbol timing, the symbol timing of the receiver 120 and the symbol timing of the transmitter 110 cannot synchronize, and this leads to erroneous symbol timing synchronization; as a result, the receiver 120 cannot process reception signals according to a right symbol timing and the performance of the receiver 120 is affected.

Some literatures in re CSD technique research are listed below:
1. Yuan Fang, "Symbol timing synchronization for IEEE 802.11n WLAN systems", Electronic Design Engineering, No. 13, Vol. 21, July 2013.
2. Yu-Zhen Chen, "Interoperable Symbol Timing Synchronization Algorithm between IEEE 802.11n and IEEE 802.11a/g", thesis of Graduate Institute of Computer and Communication Engineering, July 2012.

SUMMARY OF THE INVENTION

An object of the present invention is to provide a symbol timing determining device and method capable of preventing the problems of the prior arts.

An object of the present invention is to provide a symbol timing determining device and method capable of determining whether a symbol timing is related to a pseudo path and thereby selecting a correct symbol timing favorable for the performance of a receiver.

The present invention discloses a symbol timing determining device capable of preventing erroneous symbol timing synchronization of a communication system. An embodiment of the symbol timing determining device includes a symbol timing detecting circuit, an estimation signal generating circuit, a channel impulse response signal generating circuit, a power measuring circuit and a decision circuit. The symbol timing detecting circuit is configured to detect a reception signal to obtain a first symbol timing and configured to shift the first symbol timing to obtain a second symbol timing. The estimation signal generating circuit is configured to process the reception signal according to the first symbol timing to obtain a first channel estimation frequency-domain signal and configured to process the reception signal according to the second symbol timing to obtain a second channel estimation frequency-domain signal. The channel impulse response signal generating circuit is configured to generate a first channel estimation impulse response time-domain signal according to the first channel estimation frequency-domain signal and configured to generate a second channel estimation impulse response time-domain signal according to the second channel estimation frequency-domain signal. The power measuring circuit is configured to measure first energy of the first channel estimation impulse response time-domain signal according to a first predetermined signal region of the first channel estimation impulse response time-domain signal, and configured to measure second energy of the second channel estimation impulse response time-domain signal according to a second predetermined signal region of the second channel estimation impulse response time-domain signal. The decision circuit is configured to adopt one of the first symbol timing and the second symbol timing by determining whether a relation between the first energy and the second energy conforms to a predetermined relation.

The present invention also discloses a symbol timing determining method capable of preventing erroneous symbol timing synchronization of a communication system. An embodiment of the symbol timing determining method includes the following steps: receiving a reception signal to obtain a first symbol timing; processing the reception signal according to the first symbol timing to obtain a first channel estimation frequency-domain signal; generating a first channel estimation impulse response time-domain signal according to the first channel estimation frequency-domain signal; measuring first energy of the first channel estimation impulse response time-domain signal according to a first predetermined signal region of the first channel estimation impulse response time-domain signal; shifting the first symbol timing to obtain a second symbol timing; processing the reception signal according to the second symbol timing to obtain a second channel estimation frequency-domain signal; generating a second channel estimation impulse response time-domain signal according to the second channel estimation frequency-domain signal; measuring second energy of the second channel estimation impulse response time-domain signal according to a second predetermined signal region of the second channel estimation impulse response time-domain signal; determining whether a relation between the first energy and the second energy conforms to a predetermined relation; when the relation conforms to the predetermined relation, adopting the second symbol timing; and when the relation does not conform to the predetermined relation, adopting the first symbol timing.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
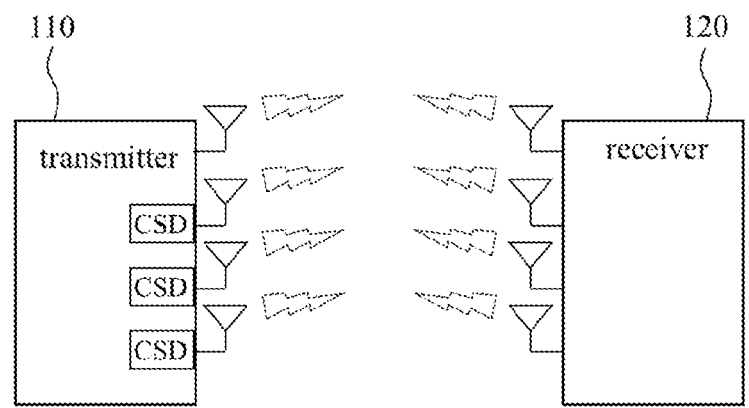
FIG. 1 shows a conventional wireless OFDM communication system.
Figure 2:
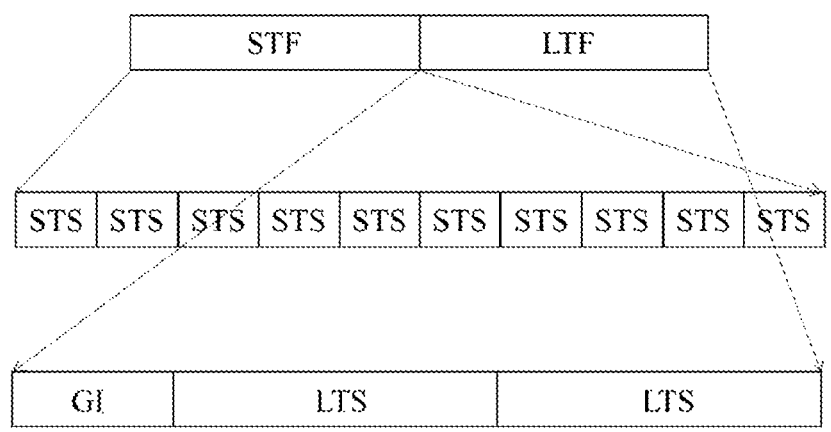
FIG. 2 shows a conventional format of a preamble.

Orthogonal Frequency-Division Multiplexing (OFDM) technique is widely used in a communication system such as an IEEE 802.11a/g/n/ac/ax system or a Long Term Evolution (LTE) system. An OFDM communication system needs highly accurate setting of carrier frequency offset and symbol timing synchronization. In order to increase the performance of the communication system, a transmitter of the communication system puts a preamble in the front of a frame so that a receiver can use the well-defined preamble to estimate the carrier frequency offset and detect the symbol timing and thereby execute calibration to the carrier frequency offset and/or the symbol timing before receiving the data payload of the frame. An instance of the format of the above-mentioned preamble is shown in FIG. 2. The format of the preamble in FIG. 2 is applicable to an IEEE 802.11a/g/n/ac/ax system; this format is well known and includes a short training field (STF) and a long training field (LTF). The STF includes ten short training sequences (STSs) while the LTF includes a guard interval (GI) and two long training sequences (LTSs). The length of each STS is 0.8 microsecond, the length of each LTS is 3.2 microsecond and the length of the GI is 1.6 microsecond. The STSs can be used for packet detection, automatic gain control (AGC) and the estimation of coarse carrier frequency offset. The LTSs can be used for the estimation of fine carrier frequency offset and symbol timing synchronization.

A conventional method for symbol timing synchronization carries out cross correlation calculation to a known LTS and a reception signal in the time-domain as shown in the following equation 1:

$$\varepsilon(T) = \Sigma_{n=0}^{L-1} r(\tau+n) s^*(n) \qquad \text{(Eq. 1)},$$

in which $\tau$ is a time variable, $r(\tau+n)$ is the reception signal, $s^*(n)$ is the LTS, the superscript "*" stands for complex conjugate, L is the length of the LTS, and n is the sampling point. When $|\varepsilon(\tau)|$ is greater than a predetermined value, the $\tau$ is the detected symbol timing and the $\varepsilon(\tau)$ is the channel impulse response (e.g., FIG. 3). When a transmitter uses multiple antennas for Cyclic Shift Diversity (CSD) transmission, the transmission signal of each antenna is a cyclic shift clone of an original signal, and the reception signal of a receiver is the sum of the transmission signals from the multiple antennas of the transmitter. Table 1 shows the cyclic shift amount defined by IEEE 802.11, in which the number of transmit chain (i.e., "TC number" in Table 1) is related to the number of antennas for CSD transmission, "ns" stands for nanosecond. It should be noted that the content and the utilization of Eq. 1 and Table 1 are well known, and thus their detail is omitted here.

TABLE 1

| TC number | cyclic shift of first transmit chain (ns) | cyclic shift of second transmit chain (ns) | cyclic shift of third transmit chain (ns) | cyclic shift of fourth transmit chain (ns) |
|---|---|---|---|---|
| 1 | 0 | — | — | — |
| 2 | 0 | −200 | — | — |
| 3 | 0 | −100 | −200 | — |
| 4 | 0 | −50 | −100 | −150 |

For better understanding, the following description is written on the basis of a transmitter carrying out CSD transmission by two antennas. People of ordinary skill in the art can derive the modifications of the present invention in accordance with the present disclosure and the existing knowledge.

Figure 3:
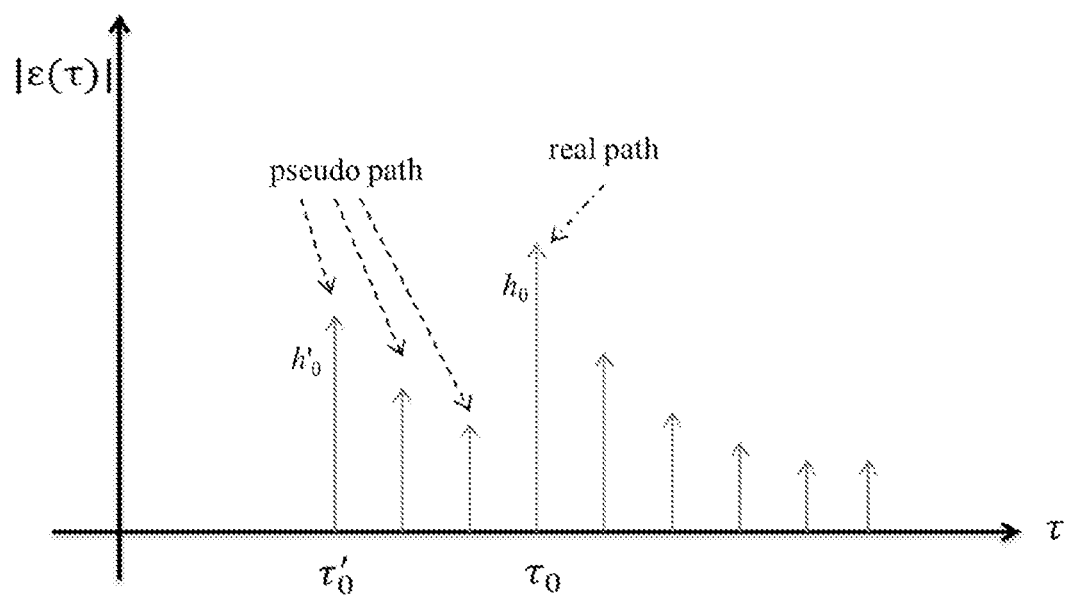
FIG. 3 shows an output result generated by a receiver processing a reception signal in a conventional manner of cross correlation calculation.

FIG. 3 shows an output result generated by a receiver processing a reception signal in a manner of cross correlation calculation when a transmitter carries out CSD transmission with two antennas. As shown in FIG. 3, since pseudo multipaths caused by CSD technique exist, the symbol timing $\tau$ obtained by using Eq. 1 could be a symbol timing $\tau'_0$ of a pseudo path $h'_0$ instead of a symbol timing $\tau_0$ of a real path $h_0$. According to Table 1, when the transmitter carries out CSD transmission with two antennas, the maximum difference between the cyclic shifts of different transmit chains is 200 nanosecond; accordingly, it is reasonable to assume that the error between $\tau'_0$ and $\tau_0$ is 200 nanosecond.

Figure 4:
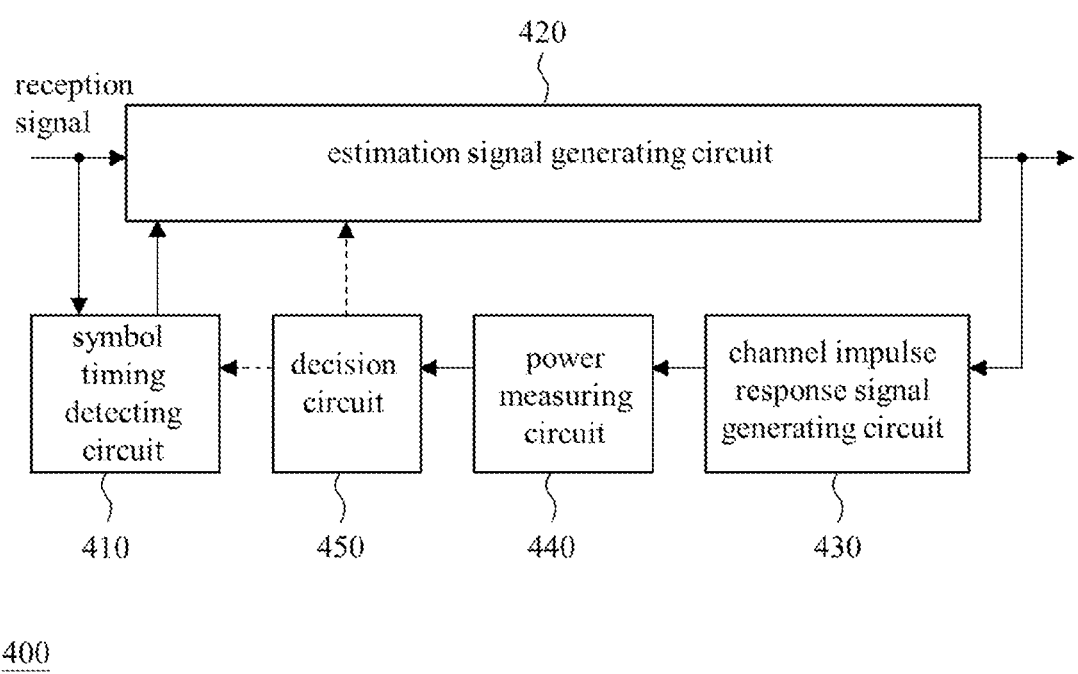
FIG. 4 shows an embodiment of the symbol timing determining device of the present invention.

In order to determine the symbol timing $\tau$ is $\tau'_0$ or $\tau_0$, the present invention discloses a symbol timing determining device for this determination. FIG. 4 shows an embodiment of the symbol timing determining device of the present invention. As shown in FIG. 4, the symbol timing determining device 400 includes a symbol timing detecting circuit 410, an estimation signal generating circuit 420, a channel impulse response signal generating circuit 430, a power measuring circuit 440 and a decision circuit 450.

The symbol timing detecting circuit 410 is configured to detect a reception signal (e.g., a signal outputted by an analog-to-digital converter of a receiver of a communication system) according to Eq. 1 and thereby obtain a first symbol timing $\tau_1$. The symbol timing detecting circuit 410 is further configured to shift the first symbol timing $\tau_1$ to obtain a second symbol timing $\tau_2$, in which the shift amount of the above-mentioned shift operation is related to the CSD time shift adopted by a transmitter transmitting a signal that is received as the reception signal. In an exemplary implementation, the timing difference $t_\tau$ (i.e., symbol timing shift) between the first symbol timing $\tau_1$ and the second symbol timing $\tau_2$ is 150 nanosecond or 200 nanosecond; more specifically, according to the aforementioned Table 1, when the number of antennas is not greater than four, the maximum difference between the CSD time shifts of different transmit chains is 150 nanosecond or 200 nanosecond, and thus it is logical to assume that the timing difference between a pseudo path caused by CSD technique and a real path is 150 nanosecond (when a transmitter uses four antenna for CSD transmission) or 200 nanosecond (when a transmitter uses two or three antennas for CSD transmission) and then set the timing difference $t_\tau$ accordingly. Since a receiver may not ascertain the number of antennas for the transmitter carrying out CSD transmission, every possible timing difference (e.g., 150 nanosecond and 200 nanosecond) could be tried to find out the best option.

The estimation signal generating circuit 420 is configured to process the reception signal according to the first symbol timing $\tau_1$ to obtain a first channel estimation frequency-domain signal $\hat{H}_1$, and configured to process the reception signal according to the second symbol timing $\tau_2$ to obtain a second channel estimation frequency-domain signal $\hat{H}_2$. The signals generated by the estimation signal generating circuit 420 can be outputted to a backend circuit for the execution of some process (e.g., signal detection process and decoding process of a receiver in a communication system). In an exemplary implementation, the estimation signal generating circuit 420 is a circuit of a receiver in a communication system and operable to carry out the removal of cyclic prefix, the series-to-parallel conversion, the Fast Fourier Transform (FFT) and the channel estimation; more specifically, the estimation signal generating circuit 420 executes FFT to at least a part of the second LTS of the reception signal, which has gone through the series-to-parallel conversion, according to the first symbol timing $\tau_1$ and the second symbol timing $\tau_2$ obtained by the symbol timing detecting circuit 410, and thereby the estimation signal generating circuit 420 generates a first frequency-domain sequence $X_1$ and a second frequency-domain sequence $X_2$ as shown in the following equation 2:

$$X_1 = FFT\{r(\tau_1)\}$$

$$X_2 = FFT\{r(\tau_2)\} \quad \text{(Eq. 2)}$$

in which $r(\tau_1)$ is a reception signal sequence starting at the time point $\tau_1$ and the length of $r(\tau_1)$ is 3.2 microsecond, and $r(\tau_2)$ is a reception signal sequence starting at the time point $\tau_2$ and the length of $r(\tau_2)$ is 3.2 microsecond. Afterwards, the estimation signal generating circuit 420 uses a known long training frequency-domain sequence "S" and the Least Square algorithm to do channel estimation to the frequency-domain sequences $X_1$ and $X_2$ so as to obtain the first channel estimation frequency-domain signal $\hat{H}_1$ and the second channel estimation frequency-domain signal $\hat{H}_2$ as shown in the following equation 3:

$$\hat{H}_1 = \frac{X_1}{S}$$

$$\hat{H}_2 = \frac{X_2}{S} \quad \text{(Eq. 3)}$$

An embodiment of the channel impulse response signal generating circuit 430 is/includes a circuit capable of executing inverse Fast Fourier Transform (iFFT). The channel impulse response signal generating circuit 430 is configured to generate a first channel estimation impulse response time-domain signal $\hat{h}_1$ and a second channel estimation impulse response time-domain signal $\hat{h}_2$ according to the first channel estimation frequency-domain signal $\hat{H}_1$ and the second channel estimation frequency-domain signal $\hat{H}_2$ respectively, which can be expressed as follows:

$$\hat{h}_1 = \text{iFFT}\{\hat{H}_1\}$$

$$\hat{h}_2 = \text{iFFT}\{\hat{H}_2\} \quad \text{(Eq. 4)}$$

Figure 5A:
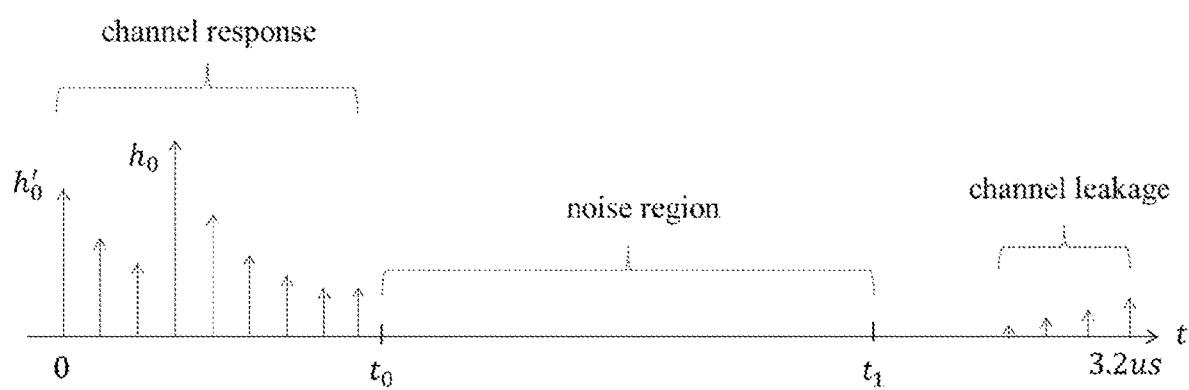
FIG. 5a shows a sequence of a channel estimation impulse response time-domain signal when a symbol timing is found a pseudo path symbol timing.
Figure 5B:
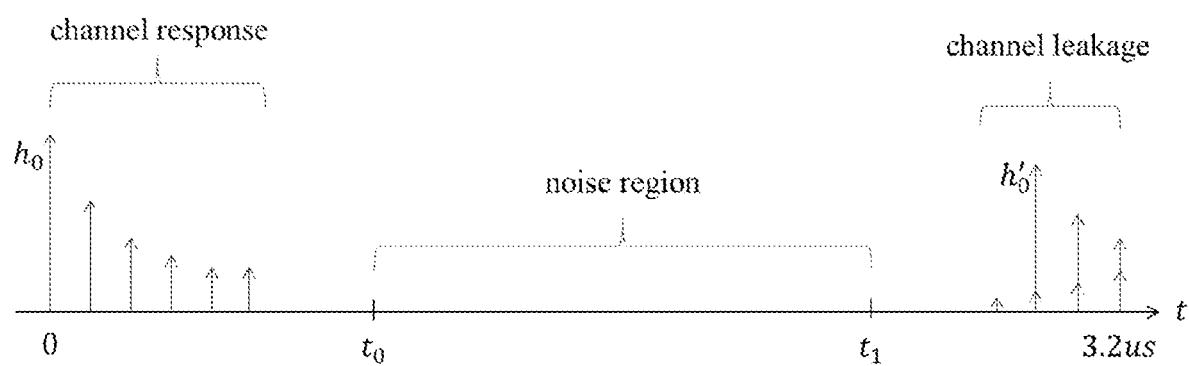
FIG. 5b shows a sequence of the second channel estimation impulse response time-domain signal when a symbol timing is found a shifted version of a pseudo path symbol timing.
Figure 5C:
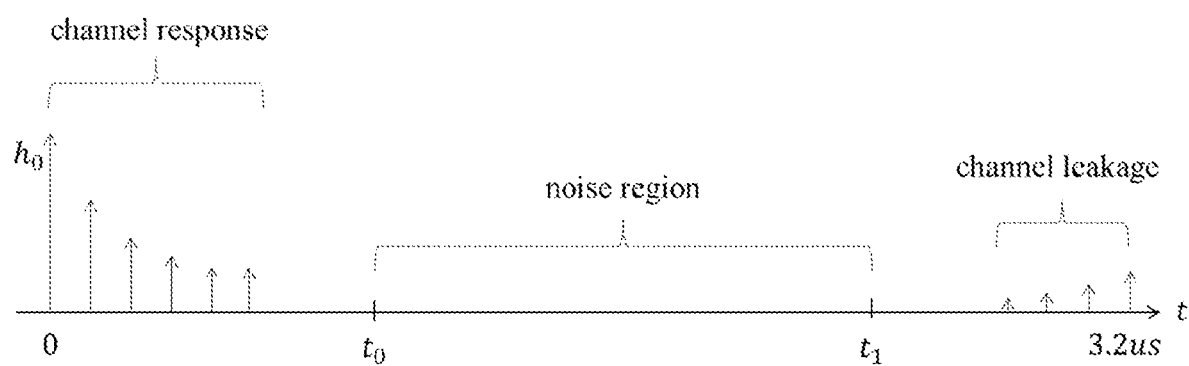
FIG. 5c shows a sequence of a channel estimation impulse response time-domain signal when a symbol timing is found a real path symbol timing.
Figure 5D:
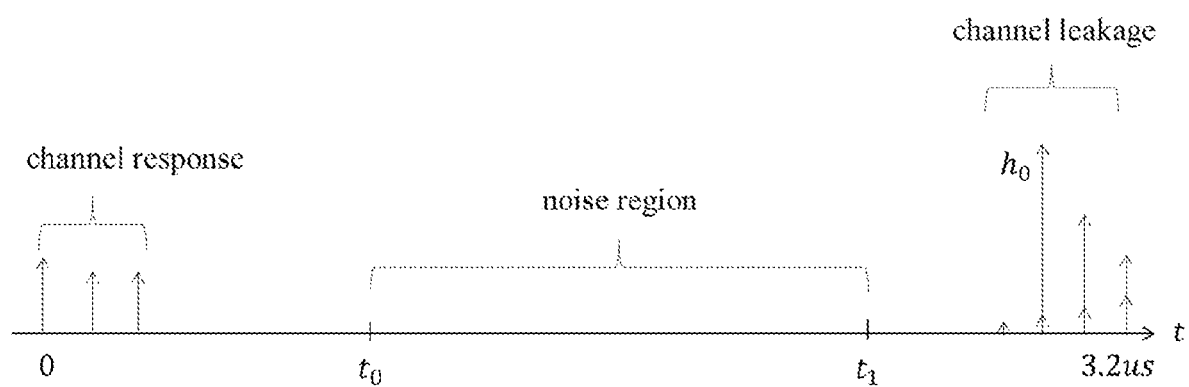
FIG. 5d shows a sequence of the second channel estimation impulse response time-domain signal when a symbol timing is found a shifted version of a real path symbol timing.

In an exemplary implementation, each of $\hat{h}_1$ and $\hat{h}_2$ is a channel estimation impulse response time-domain sequence whose length is 3.2 microsecond. If the aforementioned first symbol timing $\tau_1$ is a symbol timing of a pseudo path (e.g., the symbol timing $\rho'_0$ in FIG. 3), the examples of $\hat{h}_1$ and $\hat{h}_2$ can be illustrated with FIG. 5a and FIG. 5b respectively. In each of FIG. 5a and FIG. 5b, the channel estimation impulse response time-domain sequence includes a channel response, a channel leakage generated due to channel estimation and a noise region from $t_0$ to $t_1$. In order to prevent the energy of the noise region from being affected by the channel response and the channel leakage, a guard interval of a cyclic prefix is set for each of the two borders of the noise region, which means that the setting of $t_0$ is 0.8 microsecond relative to the first arriving path that is detected by the aforementioned receiver and the setting of $t_1$ is 2.4 microsecond. Since the symbol timing shift of a pseudo path will not cause inter-symbol interference (ISI), both the noise regions in FIG. 5a and FIG. 5b merely include noise, which means that the noise regions in FIG. 5a and FIG. 5b are pure noise regions having the same energy. On the other hand, if the first symbol timing $\tau_1$ is a symbol timing of a real path (e.g., the symbol timing $\tau_0$ in FIG. 3), the examples of $\hat{h}_1$ and $\hat{h}_2$ can be illustrated with FIG. 5c and FIG. 5d respectively. In each of FIG. 5c and FIG. 5d, the channel estimation impulse response time-domain sequence includes a channel response, a channel leakage generated due to channel estimation and a noise region from $t_0$ to $t_1$. The region from $t_0$ to $t_1$ in FIG. 5c merely includes noise energy, which means that the noise region in FIG. 5c is a pure noise region. Due to the symbol timing shift, the region from $t_0$ to $t_1$ in FIG. 5d not only includes noise but also include the inter-symbol interference (ISI) between a current symbol and a next symbol, which means that the noise region in FIG. 5d is a noise and ISI region. In light of the above, the energy of the region from $t_0$ to $t_1$ in FIG. 5d is greater than the energy of the region from $t_0$ to $t_1$ in FIG. 5c. In an exemplary implementation, $t_0$ and $t_1$ and the lengths of $\hat{h}_1$ and $\hat{h}_2$ are set in accordance with the specification for a communication system to which the present invention is applied.

The power measuring circuit 440 is configured to measure the energy $P_1$ of the first channel estimation impulse response time-domain signal $\hat{h}_1$ according to a first predetermined signal region of $\hat{h}_1$. The power measuring circuit 440 is also configured to measure the energy $P_2$ of the second channel estimation impulse response time-domain signal $\hat{h}_2$ according to a second predetermined signal region of $\hat{h}_2$. In an exemplary implementation, the range of the first predetermined signal region is equivalent to the range of the second predetermined signal region; for instance, each of the first and the second predetermined signal regions is a region from the aforementioned $t_0$ (e.g., 0.8 microsecond) to the aforementioned $t_1$ (e.g., 2.4 microsecond), and the calculation of the energy $P_1$ and the energy $P_2$ can be expressed as follows:

$$P_1 = \sum_{t=t_0}^{t_1} |\hat{h}_1(t)|^2 \quad \text{(Eq. 5)}$$

$$P_2 = \sum_{t=t_0}^{t_1} |\hat{h}_2(t)|^2$$

In an exemplary implementation, if the aforementioned first symbol timing $t_1$ is a symbol timing of a pseudo path (e.g., the symbol timing $\tau'_0$ in FIG. 3), both the first predetermined signal region and the second predetermined signal region merely include noise as shown in FIG. 5a and FIG. 5b; in the meantime, the energy $P_1$ of the first predetermined signal region is equal to the energy $P_2$ of the second predetermined signal region, or the absolute value of the difference between $P_1$ and $P_2$ is not greater than a threshold which can be properly set by one carrying out the present invention. On the other hand, if the first symbol timing $\tau_1$ is a symbol timing of a real path (e.g., the symbol timing $\tau_0$ in FIG. 3), the first predetermined signal region merely includes noise as shown in FIG. 5c while the second predetermined signal region includes noise and inter-symbol interference as shown in FIG. 5d; in the meantime, the energy $P_1$ of the first predetermined signal region is less than the energy $P_2$ of the second predetermined signal region, or the absolute value of the difference between $P_1$ and $P_2$ is greater than the aforementioned threshold.

The decision circuit 150 is configured to determine whether a relation between the energy $P_1$ of the first channel estimation impulse response time-domain signal and the energy $P_2$ of the second channel estimation impulse response time-domain signal conforms to a predetermined relation and thereby adopt one of the first symbol timing $\tau_1$ and the second symbol timing $\tau_2$. In an exemplary implementation, when the energy $P_1$ is equal to the energy $P_2$ or the absolute value of the difference between $P_1$ and $P_2$ is not greater than a threshold which can be properly set by one carrying out the present invention, the decision circuit 150 determines that the relation conforms to the predetermined relation and thereby determines that the second symbol timing $\tau_2$ is a symbol timing of a real path, and then the decision circuit 150 directly or indirectly (e.g., through the symbol timing detecting circuit 410) has the estimation signal generating circuit 420 (as indicated by the dashed line in FIG. 4) use the second symbol timing $\tau_2$ as the basis for processing the reception signal; on the other hand, when the energy $P_1$ is less than the energy $P_2$ or the absolute value of the difference between P1 and P2 is greater than the said threshold, the decision circuit 150 determines that the relation does not conform to the predetermined relation and thereby determines that the first symbol timing $\tau_1$ is a symbol timing of a real path, and then the decision circuit 150 directly or indirectly (e.g., through the symbol timing detecting circuit 410) has the estimation signal generating circuit 420 (as indicated by the dashed line in FIG. 4) use the first symbol timing $\tau_1$ as the basis for processing the reception signal. In an exemplary implementation, when a product of the energy $P_1$ and a predetermined value is not less than the energy $P_2$ (i.e., P2P1×predetermined value), the decision circuit 150 determines that the relation conforms to the predetermined relation and thereby determines that the second symbol timing $\tau_2$ is a symbol timing of a real path, and then the decision circuit 150 adopts the second symbol timing $\tau_2$; on the other hand, when a product of the energy $P_1$ and a predetermined value is less than the energy $P_2$ (i.e., P2>P1× predetermined value), the decision circuit 150 determines that the relation does not conform to the predetermined relation and thereby determines that the first symbol timing $\tau_1$ is a symbol timing of a real path, and then the decision circuit 150 adopts the first symbol timing $\tau_1$. An example of the above-mentioned predetermined value is equal to the sum of one and an energy ratio $\alpha$ (i.e., the predetermined value=$(1+\alpha)$); and an example of the energy ratio $\alpha$ is a ratio of inter-symbol interference energy $P_{ISI}$ to a noise energy $P_N$ (i.e., $$\alpha = \frac{P_{ISI}}{P_N}).$$

Figure 6:
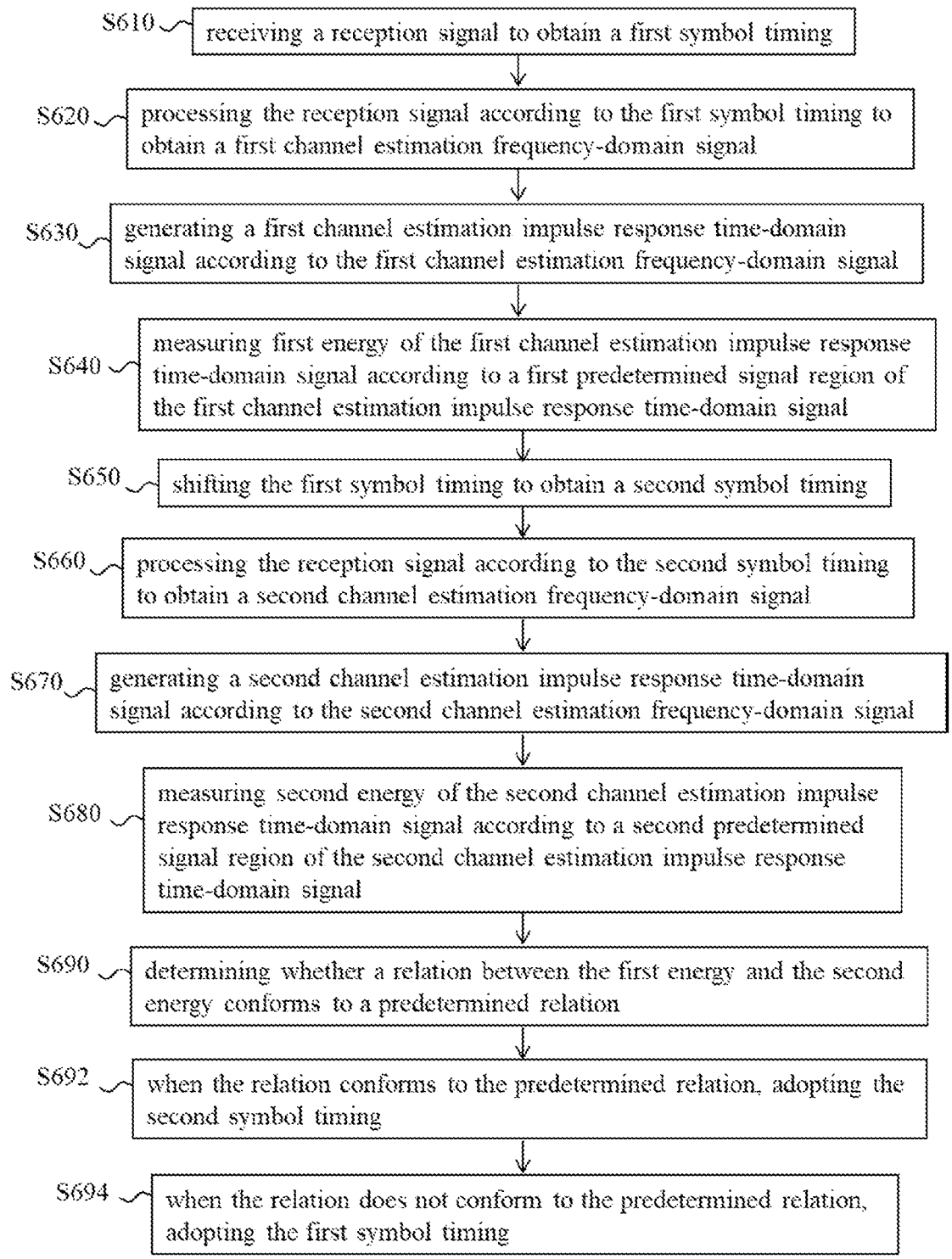
FIG. 6 shows an embodiment of the symbol timing determining method of the present invention.

The present invention further discloses a symbol timing determining method capable of preventing erroneous symbol timing synchronization of a communication system. An embodiment of the method includes the following steps as shown in FIG. 6:

step S610: receiving a reception signal to obtain a first symbol timing;

step S620: processing the reception signal according to the first symbol timing to obtain a first channel estimation frequency-domain signal;

step S630: generating a first channel estimation impulse response time-domain signal according to the first channel estimation frequency-domain signal;

step S640: measuring first energy of the first channel estimation impulse response time-domain signal according to a first predetermined signal region of the first channel estimation impulse response time-domain signal;

step S650: shifting the first symbol timing to obtain a second symbol timing;

step S660: processing the reception signal according to the second symbol timing to obtain a second channel estimation frequency-domain signal;

step S670: generating a second channel estimation impulse response time-domain signal according to the second channel estimation frequency-domain signal;

step S680: measuring second energy of the second channel estimation impulse response time-domain signal according to a second predetermined signal region of the second channel estimation impulse response time-domain signal;

step S690: determining whether a relation between the first energy and the second energy conforms to a predetermined relation;

step S692: when the relation conforms to the predetermined relation (i.e., when the first symbol timing is associated with a pseudo path), adopting the second symbol timing; and step S694: when the relation does not conform to the predetermined relation (i.e., when the first symbol timing is associated with a real path), adopting the first symbol timing.

Since those of ordinary skill in the art can appreciate the details and the modifications of the embodiment of FIG. 6 by referring to the embodiments of FIGS. 4-5d, which means that each feature of the embodiments of FIGS. 4-5d can be applied to the embodiment of FIG. 6 in a reasonable way, repeated and redundant description is omitted here. It should be noted that a person of ordinary skill in the art can derive a practicable implementation from one or several embodiments of the present invention while this implementation can include some or all features of one embodiment or include some or all features of several embodiments, which implies that the implementation of the present invention is flexible.

To sum up, the present invention can determine whether a symbol timing is associated with a pseudo path or a real path and accordingly adopt a correct symbol timing favorable for the performance of a receiver in a communication system.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A symbol timing determining device capable of preventing erroneous symbol timing synchronization of a communication system, the symbol timing determining device comprising:
    a symbol timing detecting circuit configured to detect a reception signal to obtain a first symbol timing and configured to shift the first symbol timing to obtain a second symbol timing;
    an estimation signal generating circuit configured to process the reception signal according to the first symbol timing to obtain a first channel estimation frequency-domain signal, and configured to process the reception signal according to the second symbol timing to obtain a second channel estimation frequency-domain signal;
    a channel impulse response signal generating circuit configured to generate a first channel estimation impulse response time-domain signal according to the first channel estimation frequency-domain signal, and configured to generate a second channel estimation impulse response time-domain signal according to the second channel estimation frequency-domain signal;
    a power measuring circuit configured to measure first energy of the first channel estimation impulse response time-domain signal according to a first predetermined signal region of the first channel estimation impulse response time-domain signal, and configured to measure second energy of the second channel estimation impulse response time-domain signal according to a second predetermined signal region of the second channel estimation impulse response time-domain signal; and
    a decision circuit configured to adopt one of the first symbol timing and the second symbol timing by determining whether a relation between the first energy and the second energy conforms to a predetermined relation.

2. The symbol timing determining device of claim 1, wherein a timing difference between the first symbol timing and the second symbol timing is 150 nanosecond or 200 nanosecond.

3. The symbol timing determining device of claim 1, wherein the estimation signal generating circuit is configured to process at least a part of a long training sequence of the reception signal according to the first symbol timing and a predetermined long training sequence so as to obtain the first channel estimation frequency-domain signal, and the estimation signal generating circuit is configured to process at least the part of the long training sequence of the reception signal according to the second symbol timing and the predetermined long training sequence so as to obtain the second channel estimation frequency-domain signal.

4. The symbol timing determining device of claim 1, wherein a time length of the first channel estimation impulse response time-domain signal is 3.2 microsecond and a time length of the second channel estimation impulse response time-domain signal is 3.2 microsecond.

5. The symbol timing determining device of claim 1, wherein a range of the first predetermined signal region is equivalent to a range of the second predetermined signal region.

6. The symbol timing determining device of claim 5, wherein the first predetermined signal region is between 0.8 microsecond, that is relative to a first arriving path, and 2.4 microsecond and the second predetermined signal region is between 0.8 microsecond, that is relative to the first arriving path, and 2.4 microsecond.

7. The symbol timing determining device of claim 1, wherein when the relation conforms to the predetermined relation, each of the first predetermined signal region and the second predetermined signal region is a pure noise region; and when the relation does not conform to the predetermined relation, the first predetermined signal region is a pure noise region and the second predetermined signal region is a noise and inter-symbol interference region.

8. The symbol timing determining device of claim 1, wherein when an absolute value of a difference between the first energy and the second energy is smaller than a threshold, the decision circuit determines that the relation conforms to the predetermined relation.

9. The symbol timing determining device of claim 8, wherein when the relation conforms to the predetermined relation, the decision circuit has the symbol timing determining device adopt the second symbol timing; and when the relation does not conform to the predetermined relation, the decision circuit has the symbol timing determining device adopt the first symbol timing.

10. The symbol timing determining device of claim 1, wherein when a product of the first energy and a predetermined value is not less than the second energy, the decision circuit determines that the relation conforms to the predetermined relation.

11. The symbol timing determining device of claim 10, wherein when the relation conforms to the predetermined relation, the decision circuit has the symbol timing determining device adopt the second symbol timing; and when the relation does not conform to the predetermined relation, the decision circuit has the symbol timing determining device adopt the first symbol timing.

12. The symbol timing determining device of claim 11, wherein the predetermined value is equal to a sum of one and an energy ratio which is a ratio of inter-symbol interference energy to noise energy.

13. A symbol timing determining method capable of preventing erroneous symbol timing synchronization of a communication system, the symbol timing determining method comprising:
    receiving a reception signal to obtain a first symbol timing;
    processing the reception signal according to the first symbol timing to obtain a first channel estimation frequency-domain signal;
    generating a first channel estimation impulse response time-domain signal according to the first channel estimation frequency-domain signal;
    measuring first energy of the first channel estimation impulse response time-domain signal according to a first predetermined signal region of the first channel estimation impulse response time-domain signal;

shifting the first symbol timing to obtain a second symbol timing;

processing the reception signal according to the second symbol timing to obtain a second channel estimation frequency-domain signal;

generating a second channel estimation impulse response time-domain signal according to the second channel estimation frequency-domain signal;

measuring second energy of the second channel estimation impulse response time-domain signal according to a second predetermined signal region of the second channel estimation impulse response time-domain signal;

determining whether a relation between the first energy and the second energy conforms to a predetermined relation;

when the relation conforms to the predetermined relation, adopting the second symbol timing; and when the relation does not conform to the predetermined relation, adopting the first symbol timing.

14. The symbol timing determining method of claim 13, wherein a timing difference between the first symbol timing and the second symbol timing is 150 nanosecond or 200 nanosecond.

15. The symbol timing determining method of claim 13, wherein a time length of the first channel estimation impulse response time-domain signal is 3.2 microsecond and a time length of the second channel estimation impulse response time-domain signal is 3.2 microsecond.

16. The symbol timing determining method of claim 13, wherein a range of the first predetermined signal region is equivalent to a range of the second predetermined signal region.

17. The symbol timing determining method of claim 13, wherein when the relation conforms to the predetermined relation, each of the first predetermined signal region and the second predetermined signal region is a pure noise region; and when the relation does not conform to the predetermined relation, the first predetermined signal region is a pure noise region and the second predetermined signal region is a noise and inter-symbol interference region.

18. The symbol timing determining method of claim 13, wherein when an absolute value of a difference between the first energy and the second energy is smaller than a threshold, the relation is found being in compliance with the predetermined relation.

19. The symbol timing determining method of claim 13, wherein when a product of the first energy and a predetermined value is not less than the second energy, the relation is found being in compliance with the predetermined relation.

20. The symbol timing determining method of claim 19, wherein the predetermined value is equal to a sum of one and an energy ratio which is a ratio of inter-symbol interference energy to noise energy.

* * * * *